United States Patent
Kim et al.

(10) Patent No.: US 9,712,209 B2
(45) Date of Patent: Jul. 18, 2017

(54) PLANAR SPIRAL INDUCTION COIL HAVING INCREASED QUALITY (Q)-FACTOR AND METHOD FOR DESIGNING PLANAR SPIRAL INDUCTION COIL

(71) Applicant: Samsung Electronics Co., Ltd., Suwon-si (KR)

(72) Inventors: Ki Young Kim, Yongin-si (KR); Mikhail Makurin, Arkhangelsk (RU); Vladimir Parfenyev, Khimki (RU); Nikolay Olyunin, Perm (RU); Keum Su Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 14/095,430

(22) Filed: Dec. 3, 2013

(65) Prior Publication Data
US 2014/0152118 A1 Jun. 5, 2014

(30) Foreign Application Priority Data

Dec. 3, 2012 (RU) ................................ 2012151566
Nov. 8, 2013 (KR) ........................ 10-2013-0135298

(51) Int. Cl.
*H04B 5/00* (2006.01)
*H01F 27/28* (2006.01)
*H01F 38/14* (2006.01)

(52) U.S. Cl.
CPC ....... *H04B 5/0037* (2013.01); *H01F 27/2847* (2013.01); *H01F 38/14* (2013.01); *H04B 5/0093* (2013.01)

(58) Field of Classification Search
CPC .... H04B 5/0037; H01F 27/2847; H01F 38/14
See application file for complete search history.

(56) References Cited

U.S. PATENT DOCUMENTS

| 6,501,363 | B1 * | 12/2002 | Hwu | ................... | H01F 27/2804 29/602.1 |
| 2003/0179067 | A1 * | 9/2003 | Gamou | ............... | H01F 27/2804 336/223 |
| 2005/0140482 | A1 * | 6/2005 | Cheng | ................... | H01F 38/14 336/180 |

FOREIGN PATENT DOCUMENTS

JP 2002-260934 A 9/2002
JP 2009-117546 A 5/2009

* cited by examiner

*Primary Examiner* — Jared Fureman
*Assistant Examiner* — James Evans
(74) *Attorney, Agent, or Firm* — NSIP Law

(57) ABSTRACT

A planar spiral induction coil includes a strip-shaped coil having at least one turn. The at least one turn has a width that changes as a distance from a beginning of the strip-shaped coil increases in a length direction of the strip-shaped coil. Each turn of the at least one turn has a respective width that causes an equal current to flow through each turn of the at least one turn.

19 Claims, 7 Drawing Sheets

PLANAR SPIRAL INDUCTION COIL HAVING INCREASED QUALITY (Q)-FACTOR AND METHOD FOR DESIGNING PLANAR SPIRAL INDUCTION COIL

CROSS-REFERENCE TO RELATED APPLICATIONS

This application claims the benefit under 35 USC 119(a) of Russian Patent Application No. 2012151566 filed on Dec. 3, 2012, in the Russian Federal Service for Intellectual Property, and Korean Patent Application No. 10-2013-0135298 filed on Nov. 8, 2013, in the Korean Intellectual Property Office, the entire disclosures of which are incorporated herein by reference for all purposes.

BACKGROUND

1. Field

This application relates to a planar spiral induction coil having an increased quality (Q)-factor, and a method of designing the planar spiral induction coil.

2. Description of Related Art

Induction coils are widely used in various applications, for example, wireless power transmission technology and designing of radio frequency (RF) integrated circuits. In such applications, an induction coil is typically included in an LC resonant circuit, and may be coupled to at least one capacitor.

A quality (Q)-factor indicates a degree of loss of energy storage of an induction coil, and may be defined by a ratio of a reactance value to a resistance value of the induction coil. As the Q-factor increases, a loss of the induction coil may be reduced, and a frequency selectivity characteristic in an LC resonant circuit may be increased. To improve a performance of an application, a high Q-factor may be necessary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a planar spiral induction coil includes a strip-shaped coil having at least one turn, the at least one turn having a width that changes as a distance from a beginning of the strip-shaped coil increases in a length direction of the strip-shaped coil; wherein each turn of the at least one turn has a respective width that causes an equal current to flow through each turn of the at least one turn.

A number of turns of the at least one turn may be 1 to 20 turns.

A shape of each turn of the at least one turn may be a torus having a rectangular cross section.

Each turn of the at least one turn may have constant geometric dimensions.

An amount of current flowing through each turn of the at least one turn may be proportional to a ratio of a total amount of current flowing through the planar spiral induction coil to a number of turns of the at least one turn.

In another general aspect, a wireless power transmitter includes a source resonator configured to transmit wireless power to a wireless power receiver via resonance with a target resonator of the wireless power receiver, and comprising a planar spiral induction coil, the planar spiral induction coil comprising a strip-shaped coil having at least one turn, the at least one turn having a width that changes as a distance from a beginning of the strip-shaped coil increases in a length direction of the strip-shaped coil; and a power supply configured to supply power to the source resonator; wherein each turn of the at least one turn has a respective width that causes an equal current to flow through each turn of the at least one turn.

In another general aspect, a wireless power receiver includes a target resonator configured to receive wireless power from a wireless power transmitter via resonance with a source resonator of the wireless power transmitter, and comprising a planar spiral induction coil, the planar spiral induction coil comprising a strip-shaped coil having at least one turn, the at least one turn having a width that changes as a distance from a beginning of the strip-shaped coil increases in a length direction of the strip-shaped coil; and a load configured to receive power from the target resonator; wherein each turn of the at least one turn has a respective width that causes an equal current to flow through each turn of the at least one turn.

In another general aspect, a method of designing a planar spiral induction coil includes setting a number of turns of at least one turn in a strip-shaped coil included in the planar spiral induction coil, the at least one turn having a width that changes as a distance from a beginning of the strip-shaped coil increases in a length direction of the strip-shaped coil; and determining a respective width of each turn of the at least one turn so that an equal current flows through each turn of the at least one turn.

The method may further include setting a distance between adjacent turns of the at least one turn.

The setting of the number of turns of the at least one turn may include setting the number of turns of the at least one turn within a range of 1 turn to 20 turns.

A shape of each turn of the at least one turn may be a torus having a rectangular cross-section.

Each turn of the at least one turn may have constant geometric dimensions.

The determining of the respective width of each turn of the at least one turn may include acquiring information on a current flowing through a single turn having a same width as the planar spiral induction coil; splitting the single turn into a plurality of domains corresponding to the at least one turn based on the set number of turns of the at least one turn; setting respective widths of the plurality of domains so that an equal current flows through each domain of the plurality of domains; and setting the respective width of each turn of the at least one turn to the respective width of a corresponding domain of the plurality of domains.

An amount of current flowing through each turn of the at least one turn may be proportional to a ratio of a total amount of current flowing through the planar spiral induction coil to the set number of turns of the at least one turn.

In another general aspect, a non-transitory computer-readable storage medium stores a program to control a computer to implement the method of claim 8.

In another general aspect, a planar spiral induction coil includes a planar coil having at least turn; wherein each turn of the at least one turn has a respective width that is different from a respective width of every other turn of the at least one turn and causes an equal current to flow through each turn of the at least one turn.

A respective width of each turn of the at least one turn may increase from an innermost turn of the at least one turn to an outermost turn of the least one turn.

Each turn of the at least one turn may have constant geometric dimensions.

The constant geometric dimensions of each turn may be different from the constant geometric dimensions of every other turn of the at least one turn.

A shape of each turn of the at least one turn may be a torus having a rectangular cross section; and the rectangular cross section of the torus of the shape of each turn of the at least one turn is different from the rectangular cross section of the torus of the shape of every other turn of the at least one turn.

Other features and aspects will be apparent from the following detailed description, the drawings, and the claims.

DETAILED DESCRIPTION

Figure 1:
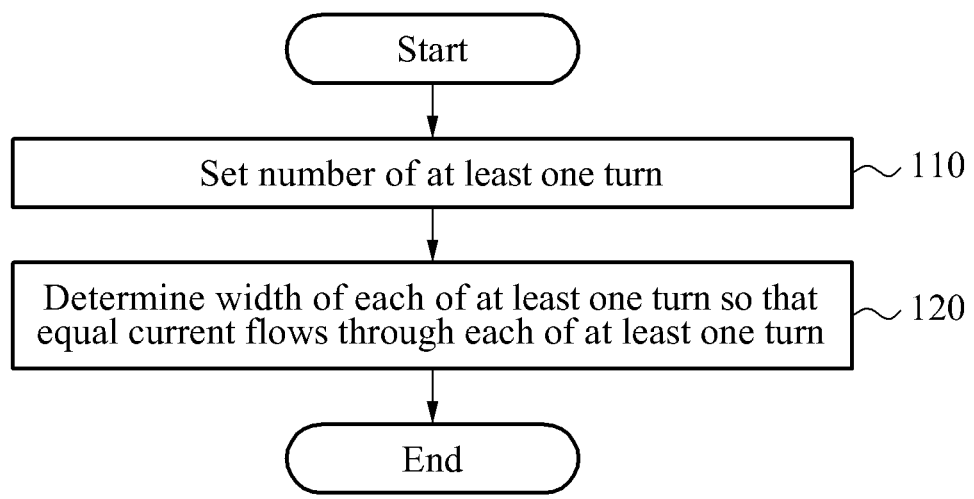
FIG. 1 illustrates an example of a method of designing a planar spiral induction coil.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a method of designing a planar spiral induction coil. Referring to FIG. 1, in 110, a number of at least one turn in a planar spiral induction coil is set. The planar spiral induction coil may include, for example, a strip-shaped coil having at least one turn. A width of the at least one turn may change as a distance from a beginning of the strip-shaped coil increases in a length direction of the strip-shaped coil. The planar spiral induction coil may be a non-uniform induction coil.

A number of turns in the planar spiral induction coil or the strip-shaped coil may be denoted by N. The number of turns in the planar spiral induction coil may be set within a range of 1 to 20 turns. In an example in which the number of turns in the planar spiral induction coil is set to 1, the planar spiral induction coil may have a single turn. In another example in which the number of turns in the planar spiral induction coil is set to 20, the planar spiral induction coil may have 20 turns. The number of turns in the planar spiral induction coil may be randomly set. For example, when a resonant frequency of the spiral induction coil is set to 6.78 megahertz (MHz) and the planar spiral induction coil has an inner radius of 20 millimeters (mm) and an outer radius of 70 mm, the number of turns may be set within a range of 8 to 11.

In 120, a width of each of the at least one turn is determined so that an equal current flows through each of the at least one turn.

In an example in which an induction coil has a wide metal turn, the induction coil may have a low ohmic resistance, which may increase a coil constant of the induction coil. In this example, the induction coil may have a low inductance. Due to the low inductance of the induction coil, in a resonant circuit including the induction coil and a capacitor, an equivalent series resistance (ESR) of the capacitor may become greater than an ESR of a capacitor in a typical resonant circuit including a typical inductor and the capacitor. An increase in the ESR of the capacitor may decrease a quality (Q)-factor of the resonant circuit. Accordingly, to reduce an influence of the capacitor on the resonant circuit, designing an induction coil to have a high coil constant as well as a high active resistance may be necessary.

In an example in which an induction coil is assumed to be a spiral coil in which each turn has a constant width and there is a constant distance between adjacent turns, a resistance and an inductance of the induction coil may be increased. Due to the increase in the resistance and the inductance, an ESR of a capacitor in a resonant circuit including the induction coil and the capacitor may become less than the resistance of the induction coil. Accordingly, the capacitor may influence a Q-factor of the resonant circuit.

To further increase the coil constant of the induction coil, the induction coil may include, for example, a planar spiral induction coil. A width of each of turn of at least one turn in the planar spiral induction coil, and a distance between adjacent turns of the at least one turn, hereinafter referred to as an "inter-turn distance," may be changed. When the induction coil includes the planar spiral induction coil, an inductance and an active resistance of the resonant circuit may be increased without a great reduction in the coil constant. Additionally, due to a change in the width and the inter-turn distances of the planar spiral induction coil, the resistance of the resonant circuit may be reduced, and a change in the inductance may also be reduced.

A shape of each turn of the at least one turn of the planar spiral induction coil may be a torus having a rectangular cross section. Additionally, each turn of the at least one turn may have constant geometric dimensions that are different from constant geometric dimensions of every other turn of the at least one turn.

A width of each of the at least one turn in the planar spiral induction coil may be determined using a single turn so that equal current may flow through each of the at least one turn.

Information on a current flow through a single turn having the same width as the planar spiral induction coil may be acquired. The single turn may be, for example, a metal turn. The single turn may be split into a plurality of domains based on the number of the at least one turn set in 110. For example, when the number of the at least one turn is set to 3 in 110, a single turn may be split into three domains, for example a first domain, a second domain, and a third domain. A width of each of the three domains may be set so that an equal current may flow through each of the three domains. Additionally, a width of each of the three domains may be set to a width of each of the at least one turn. When a total amount of current flowing through the single turn is denoted as by $I_0$ and a number of turns is denoted by N, an amount of current flowing through each of the three domains may be denoted by $I_0$.

For example, when the single turn has an inner radius of 10 mm and an outer radius of 40 mm, and when an equal current is measured at domains corresponding to radiuses of 15 mm, 25 mm, and 40 mm in the single turn, the first domain, the second domain, and the third domain may be set to a first domain ranging from 10 mm to 15 mm, a second domain ranging from 15 mm to 25 mm, and a third domain ranging from 25 mm to 40 mm in the single turn. Accordingly, in the planar spiral induction coil, a width of a first turn, a width of a second turn, and a width of a third turn may be set to 5 mm, 10 mm, and 15 mm, respectively. The first turn, the second turn, and the third turn may be set to a first domain ranging from 10 mm to 15 mm, a second domain ranging from 15 mm to 25 mm, and a third domain ranging from 25 mm to 40 mm in the planar spiral induction coil, respectively.

An amount of current flowing through a single turn may be maximized within the single turn, and accordingly an inner turn of the planar spiral induction coil may have a relatively small width, an outer turn of the planar spiral induction coil may have a relatively wide width, and turns of the planar spiral induction coil between the inner turn and the outer turn may have widths between the width of the inner turn and the width of the outer turn that increase towards the outer turn of the planar spiral induction coil.

Additionally, an inter-turn distance of the planar spiral induction coil may be set.

Hereinafter, a method of designing a planar spiral induction coil will be described with reference to FIGS. 2A through 2C.

Figure 2A:
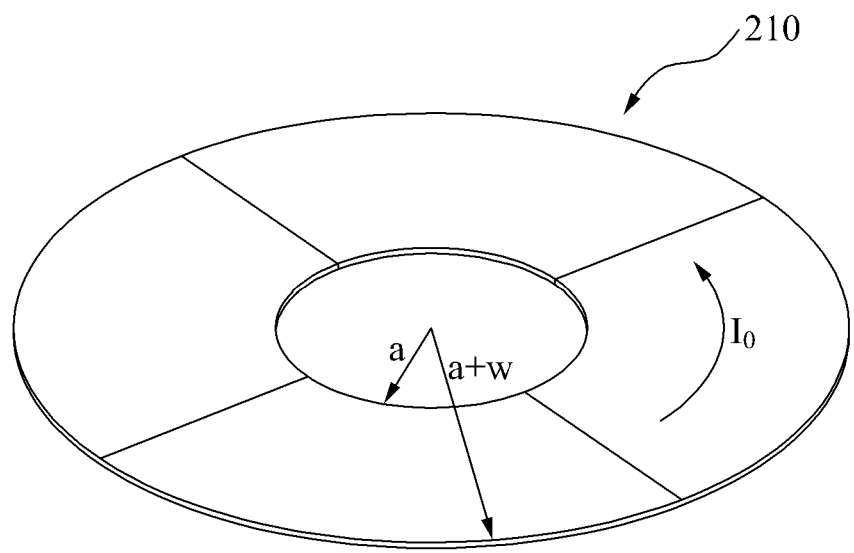
FIGS. 2A through 2C illustrate another example of a method of designing a planar spiral induction coil.

Referring to FIG. 2A, a width of a single turn 210 may be the same as a width of a planar spiral induction coil having a single turn. The single turn 210 may have a shape of a wide metal turn. An inner radius of the single turn 210 is denoted by "a," the width of the single turn 210 is denoted by "w," and a current flowing through the single turn 210 is denoted by $I_0$. The single turn 210 may have an extremely low ohmic resistance, and accordingly a coil constant of the single turn 210 may be increased.

Figure 2B:
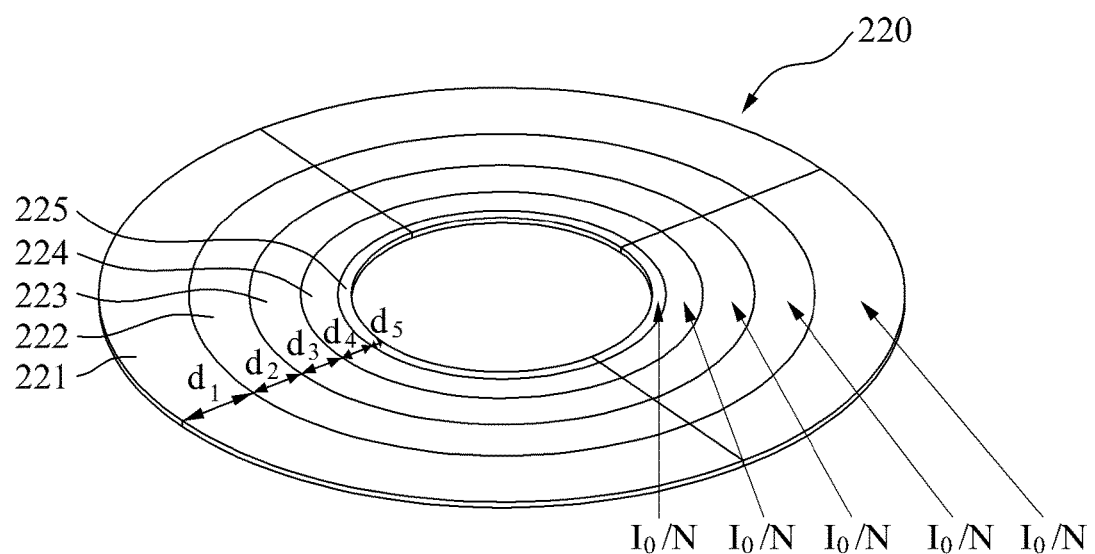

Referring to FIG. 2B, a single turn 220 may be split into a plurality of domains based on a number of turns in a planar spiral induction coil. In the example of FIG. 2B, the number of turns in the planar spiral induction coil is set to 5, and the single turn 220 is split into five domains 221 to 225. Widths of the domains 221 to 225 are denoted by $d_1$ to $d_5$, respectively. The widths $d_1$ to $d_5$ may be designed so that an equal current may flow through each of the domains 221 to 225. When a total amount of current flowing through a single turn is denoted by $I_0$ and a number of turns is denoted by N, an amount of current flowing through each of a plurality of domains into which a single turn is split may be denoted by $I_0/N$. In this example, the number of turns is set to 5, and accordingly an amount of current flowing through each of the domains 221 to 225 may be denoted by $I_0/5$.

Figure 2C:
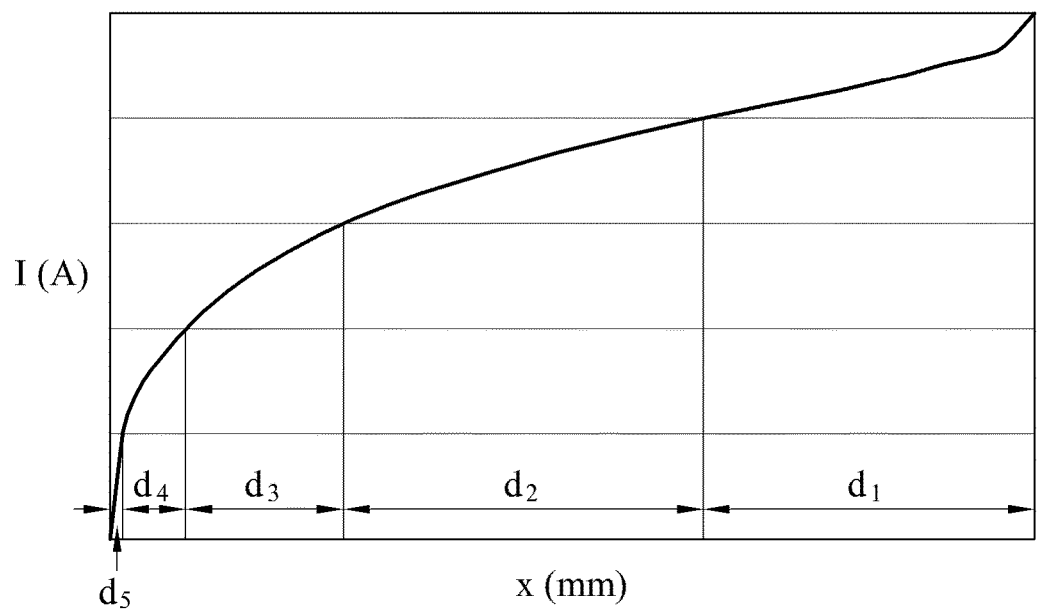

FIG. 2C illustrates a graph of information on current flow through a single turn having the same width as a planar spiral induction coil. In the graph, an x-axis represents a distance in a width direction of the single turn in mm, and a y-axis represents an amount of current flowing through the single turn in amperes (A). The information on the current flow may be, for example, information on a dependence of current flowing through a single turn.

The single turn may be split into a plurality of domains based on the information on the current flow. In an example in which a number of turns in a planar spiral induction coil is set to 5, the single turn may be split into five domains through which an equal current flows. A width of each of the five domains may be set so that an equal current may flow through each of the five domains. Additionally, the widths of five turns in the planar spiral induction coil may be set to the widths of the five domains. An amount of current flowing through the single turn may increase towards a center of the single turn.

For example, in the graph of FIG. 2C, when an inner radius and an outer radius of a single turn are set to 10 mm and 70 mm, respectively, an equal current may flow in a width ranging from 10 mm to 13 mm, a width ranging from 13 mm to 18 mm, a width ranging from 18 mm to 28 mm, a width ranging from 28 mm to 48 mm, and a width ranging from 48 mm to 70 mm, from the center of the single turn. Accordingly, the planar spiral induction coil may be split into five domains having inner radiuses of 10 mm, 13 mm, 18 mm, 28 mm, and 48 mm from a center of the planar spiral induction coil, and outer radiuses of 13 mm, 18 mm, 28 mm, 48 mm, and 70 mm from the center of the planar spiral induction coil. A first domain, a second domain, a third domain, a fourth domain, and a fifth domain of the planar spiral induction coil may be set to a domain having a width ranging from 10 mm to 13 mm, a domain having a width ranging from 13 mm to 18 mm, a domain having a width ranging from 18 mm to 28 mm, a domain having a width ranging from 28 mm to 48 mm, and a domain having a width ranging from 48 mm to 70 mm, respectively, from a center of the spiral induction coil. Accordingly, a first turn, a second turn, a third turn, a fourth turn, and a fifth turn of the planar spiral induction coil may be set to have a width of 3 mm, a width of 5 mm, a width of 10 mm, a width of 20 mm, and a width of 22 mm, respectively.

A method of designing a planar spiral induction coil may be implemented using a full-wave three-dimensional (3D) electromagnetic simulator. For example, the full-wave 3D electromagnetic simulator may acquire current flow information regarding current flowing through a single turn having a shape of a torus having a rectangular cross-section. In this example, an inner radius and an outer radius of the single turn may be denoted by "a" and "w," respectively, and the outer radius "w" may be equal to or greater than "x" denoting a width of the single turn. The full-wave 3D electromagnetic simulator may plot the current flow information on a graph.

The graph representing the plotted current flow information may be expressed by a current flow line as illustrated in FIG. 2C. In the graph, an x-axis represents a distance in a width direction of the single turn, and a y-axis represents an amount of current flowing through the single turn. The full-wave 3D electromagnetic simulator may split the y-axis of the graph representing the plotted current flow information into N equal parts, wherein N denotes a number of turns in the planar spiral induction coil through which an equal current flows.

Additionally, the full-wave 3D electromagnetic simulator may plot, from the y-axis, lines that are parallel to the x-axis, begin at points on the y-axis corresponding to the N equal parts into which the y-axis is split, and intersect the current flow line, thereby splitting the current flow line into N equal parts in the y-axis direction.

The full-wave 3D electromagnetic simulator may plot, from the x-axis, lines that are perpendicular to the x-axis and end at the points on the current flow line where the lines plotted from the y-axis intersect the current flow line. Distances between the lines that are perpendicular to the x-axis may be denoted by $d_1, d_2, \ldots,$ and $d_N$, which may be respective widths of domains into which the single turn is split. The widths of turns of the planar spiral induction coil may be set to the widths $d_1, d_2, \ldots,$ and $d_N$ of the domains, respectively. The planar spiral induction coil having the turns having the set widths $d_1, d_2, \ldots,$ and $d_N$ may provide a high Q-factor in a resonant circuit.

Figure 3:
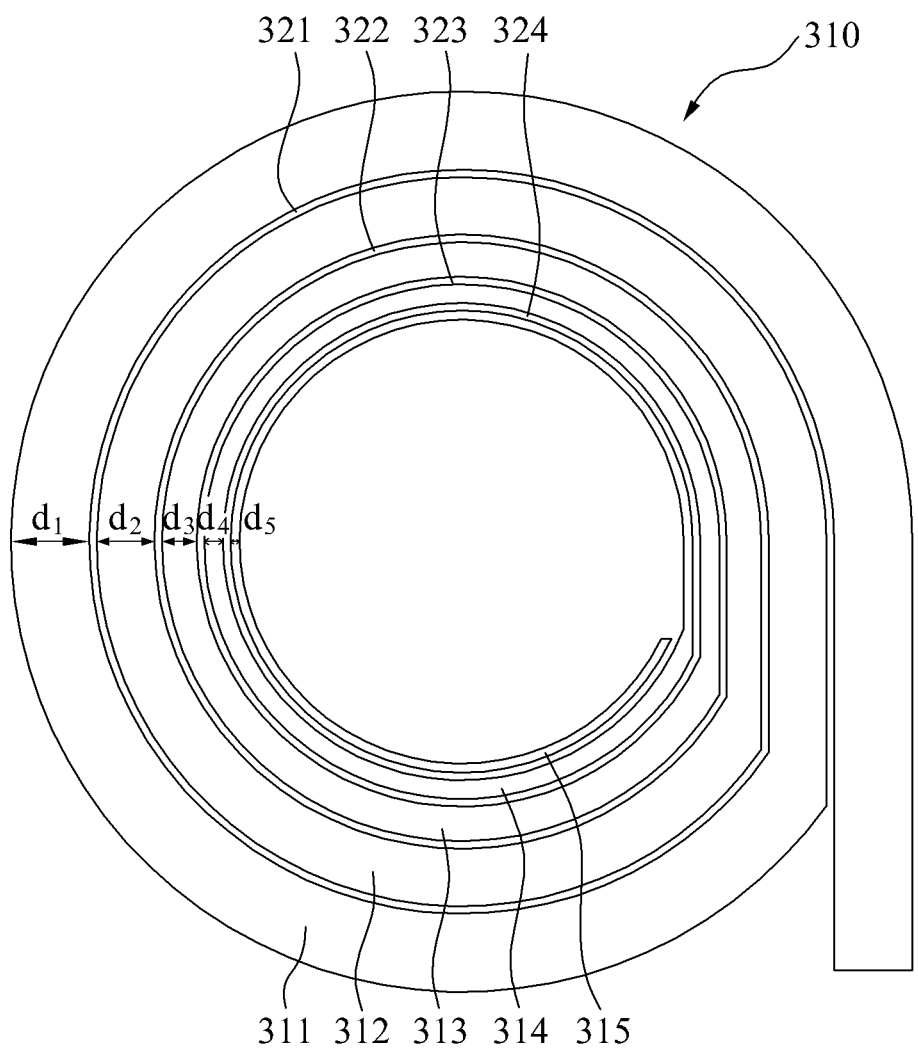
FIG. 3 illustrates an example of a planar spiral induction coil.

FIG. 3 illustrates an example of a planar spiral induction coil. Referring to FIG. 3, a planar spiral induction coil 310 may include a strip-shaped coil having at least one turn. A width of the at least one turn may change as a distance from a beginning of the strip-shaped coil increases in a length direction of the strip-shaped coil. A number of turns in the planar spiral induction coil 310 may be set within a range of 1 to 20. For example, the planar spiral induction coil 310 may have five turns 311 to 315. Additionally, a shape of each turn of the turns 311 to 315 may be a torus having a rectangular cross section. Also, each turn of the turns 311 to 315 may have constant geometric dimensions that are different from constant geometric dimension of every other turn of the turns 311 to 315. For example, the turn 311 may have constant geometric dimensions that are different from the constant geometric dimensions of each turn of the turns 312 to 315

A width of each of the turns 311 to 315 in the planar spiral induction coil 310 may be designed so that an equal current may flow through each of the turns 311 to 315. An amount of current flowing through each of the turns 311 to 315 may be proportional to a ratio of a total amount of current flowing through the planar spiral induction coil 310 to the number of the turns 311 to 315. For example, when the total amount of current flowing through the planar spiral induction coil 310 is denoted by $I_0$ and a number of turns in the planar spiral induction coil 310 is denoted by N, an amount of current flowing through each of the turns may be denoted by $I_0/N$.

An amount of current flowing through the planar spiral induction coil 310 increases towards a center of the planar spiral induction coil 310, and decreases towards an outer edge of the planar spiral induction coil 310. Accordingly, an inner turn of the planar spiral induction coil 310 may have a relatively small width, an outer turn of the planar spiral induction coil 310 may have a relatively large width, and turns of the planar spiral induction coil 310 between the inner turn and the outer turn may have widths between the width of the inner turn and the width of the outer turn that increase towards the outer turn of the planar spiral induction coil 310.

A width of each of the turns 311 to 315 and inter-turn distances 321 to 324 may be determined by the method described above with reference to FIGS. 1 through 2C.

Figure 4A:
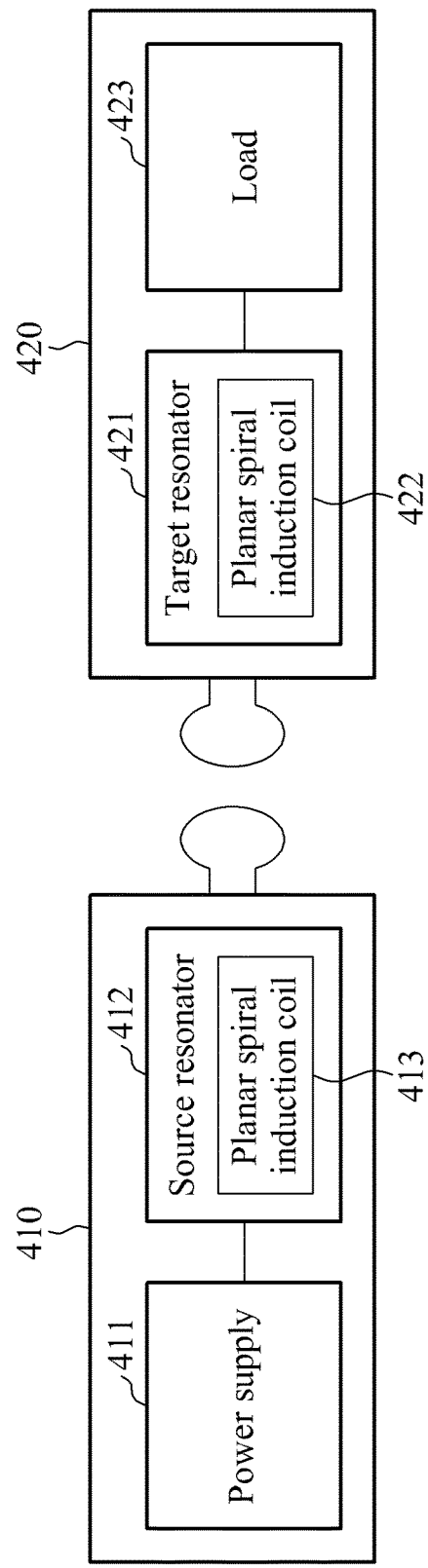
FIGS. 4A and 4B illustrate examples of a wireless power transmission system.

FIG. 4A illustrates an example of a wireless power transmission system. Referring to FIG. 4A, the wireless power transmission system includes a wireless power transmitter 410 and a wireless power receiver 420. The wireless power transmitter 410 is a device configured to supply wireless power, and may be any electronic devices capable of supplying power supply, such as, for example, a pad, a terminal, a tablet personal computer (PC), a television (TV), a medical device, or an electric vehicle. The wireless power receiver 420 is a device configured to receive wireless power, and may be any electronic device needing power to operate, for example, a pad, a terminal, a tablet PC. a TV, a medical device, an electric vehicle, a washing machine, a radio, or a lighting system.

The wireless power transmitter 410 includes a power supply 411, and a source resonator 412.

The power supply 411 supplies power to the source resonator 412.

The source resonator 412 transmits wireless power to the wireless power receiver 420 via resonance with a target resonator 421. The source resonator 412 includes a planar spiral induction coil 413. The planar spiral induction coil 413 may include a strip-shaped coil having at least one turn. A width of the at least one turn in the strip-shaped coil may change as a distance from a beginning of the strip-shaped coil increases in a length direction of the strip-shaped coil, and may be set so that an equal current may flow through each of the at least one turn.

The wireless power receiver 420 includes the target resonator 421 and a load 423.

The target resonator 421 receives wireless power from the wireless power transmitter 410 via the resonance with the source resonator 412. The target resonator 421 includes a planar spiral induction coil 422. The planar spiral induction coil 422 may include a strip-shaped coil having at least one turn. A width of the at least one turn in the strip-shaped coil may change as a distance from a beginning of the strip-shaped coil increases in a length direction of the strip-shaped coil, and may be set so that an equal current may flow through each of the at least one turn.

The load 423 receives power from the target resonator 421.

Figure 4B:
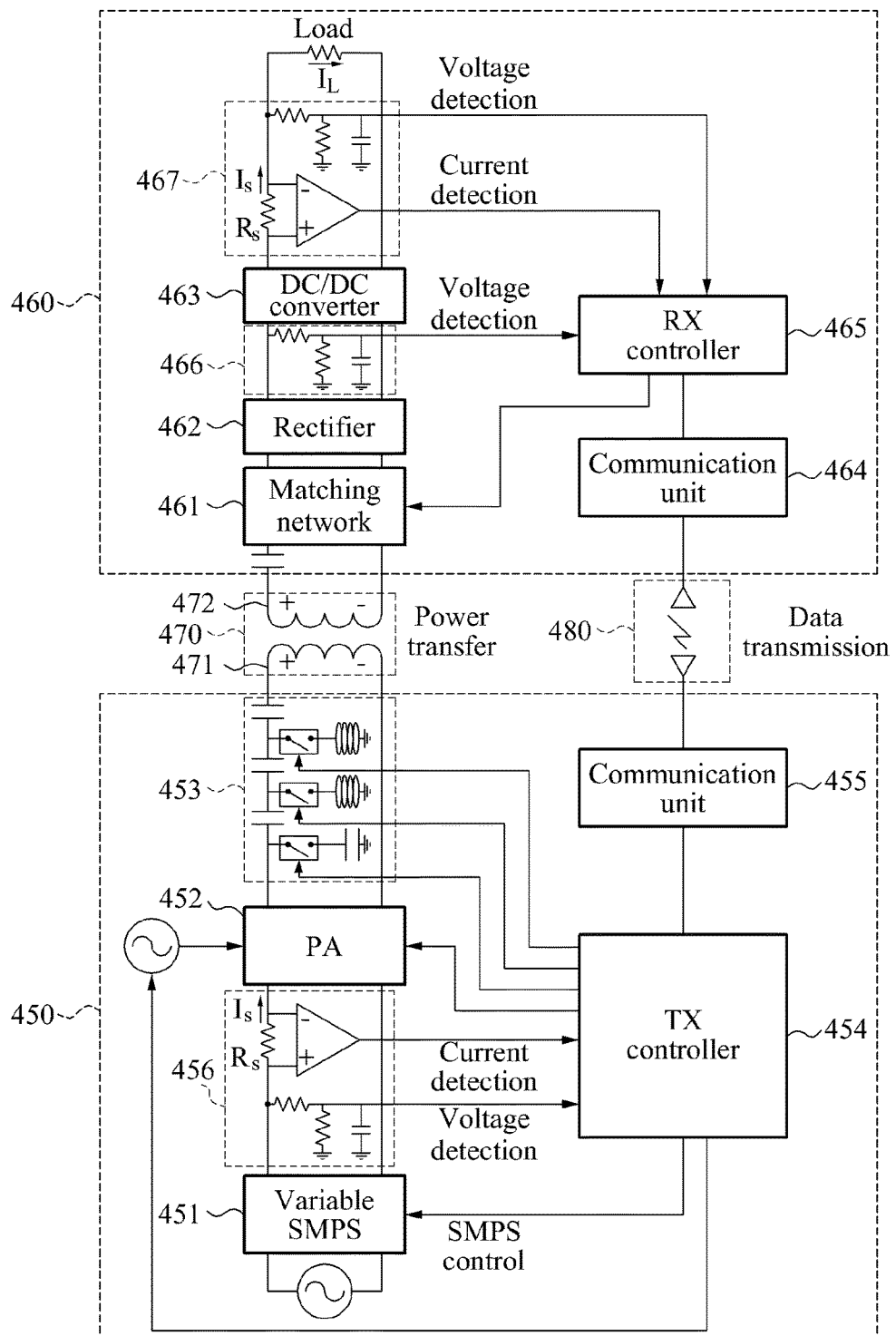

FIG. 4B illustrates another example of a wireless power transmission system. Referring to FIG. 4B, a wireless power transmitter 450 includes a variable switching mode power supply (SMPS) 451, a power amplifier (PA) 452, a matching network 453, a transmission (TX) controller 454 (for example, TX control logic), and a communication unit 455, and a power detector 456.

The variable SMPS 451 generates a direct current (DC) voltage by switching alternating current (AC) voltage having a frequency in a band of tens of hertz (Hz) output from a power supply. The variable SMPS 451 may output a fixed DC voltage having a predetermined level, or may output an adjustable DC voltage having a level that may be adjusted by the TX controller 454.

The variable SMPS 451 may control its output voltage based on a level of power output from the PA 452 so that the PA 452 may operate in a saturation region with high efficiency at all times, and may enable a maximum efficiency to be maintained at all levels of the output power of the PA 452. The PA 452 may have, for example, class-E features.

For example, if a fixed SMPS is used instead of the variable SMPS 451, a variable DC-to-DC (DC/DC) converter needs to be provided. In this example, the fixed SMPS outputs a fixed voltage to the variable DC/DC converter, and the variable DC/DC converter controls its output voltage based on the level of the power output from the PA 452 so that the PA 452 may operate in the saturation region with high efficiency at all times, and may enable the maximum efficiency to be maintained at all levels of the output power of the PA 452.

The power detector 456 detects an output current and an output voltage of the variable SMPS 451, and provides information on the detected current and the detected voltage to the TX controller 454. Also, the power detector 456 may detect an input current and an input voltage of the PA 452.

The PA 452 generates power by converting a DC voltage having a predetermined level supplied to the PA 452 by the variable SMPS 451 to an AC voltage using a switching pulse signal having a frequency in a band of a few MHz to tens of MHz. For example, the PA 452 may convert the DC voltage supplied to the PA 452 to an AC voltage having a reference resonant frequency $F_{Ref}$, and may generate a communication power used for communication, or a charging power used for charging. The communication power and the charging power may be used in a plurality of wireless power receivers.

If a large amount of power from a few kilowatts (kW) to tens of kW is to be transmitted using a resonant frequency in a band of tens of kilohertz (kHz) to hundreds of kHz, the PA 452 may be omitted, and power may be transferred to a source resonator 471 from the variable SMPS 451 or a high-power power source. For example, an inverter may be used instead of the PA 452. The inverter may convert DC power supplied from the high-power power source to AC power. The inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC having a resonant frequency of the source resonator 471 in a band of tens of kHz to hundreds of kHz.

The communication power may be a low power of 0.1 milliwatt (mW) to 1 mW. The charging power may be a high power of a few mW to tens of kW that is consumed in a device load of a wireless power receiver 460. As used herein, the term "charging" may refer to supplying power to a unit or an element that is configured to charge a battery or other device. Also, the term "charging" may refer to supplying power to a unit or an element that is configured to consume power. For example, the term "charging power" may refer to a power consumed by a load of a wireless power receiver while operating, or a power used to charge a battery of the wireless power receiver. The units or elements may be, for example, batteries, displays, sound output circuits, main processors, and various sensors.

As used herein, the term "reference resonant frequency" refers to a resonant frequency that is nominally used by the wireless power transmitter 450, and the term "tracking frequency" refers to a resonant frequency used by the wireless power transmitter 450 that has been adjusted based on a preset scheme.

The TX controller 454 may detect a reflected wave of the communication power or the charging power, and may detect mismatching that may occur between a target resonator 472 and the source resonator 471 based on the detected reflected wave. The TX controller 454 may detect the mismatching by detecting an envelope of the reflected wave, a power amount of the reflected wave, or any other characteristic of the reflected wave that is affected by mismatching.

The matching network 453 may compensate for impedance mismatching between the source resonator 471 and the target resonator 472 to achieve optimal matching under the control of the TX controller 454. The matching network 453 includes a plurality of switches each connected to a capacitor or an inductor, and the switches are controlled by the TX controller 454 to achieve optimal matching.

If a large amount of power is to be transmitted using a resonant frequency in a band of tens of kHz to hundreds of kHz, the matching network 453 may be omitted from the wireless power transmitter 450 because an effect of the matching network 453 may be reduced when transmitting the large amount of the power.

The TX controller 454 calculates a voltage standing wave ratio (VSWR) based on a voltage level of the reflected wave and a level of an output voltage of the source resonator 471 or the PA 452. For example, if the TX controller detects that the VSWR is greater than a predetermined value, the TX controller 454 may detect that there is mismatching between the source resonator 471 and the target resonator 472.

In another example, if the TX controller 454 detects that the VSWR is greater than the predetermined value, the TX controller 454 may calculate a wireless power transmission efficiency for each of N tracking frequencies, determine a tracking frequency $F_{Best}$ providing the best wireless power transmission efficiency among the N tracking frequencies, and change the reference resonant frequency $F_{Ref}$ to the tracking frequency $F_{Best}$. The N tracking frequencies may be set in advance.

The TX controller 454 may adjust a frequency of a switching pulse signal used by the PA 452. The frequency of the switching pulse signal may be determined by the TX controller 454. For example, by controlling the frequency of the switching signal used by the PA 452, the TX controller 454 may generate a modulated signal to be transmitted to the wireless power receiver 460. That is, the TX controller 454 may transmit a variety of data to the wireless power receiver 460 using in-band communication. Also, the TX controller 454 may detect a reflected wave, and may demodulate a signal received from the wireless power receiver 460 from an envelope of the detected reflected wave.

The TX controller 454 may generate the modulated signal for the in-band communication using various techniques. For example, the TX controller 454 may generate the modulated signal by turning the switching pulse signal used by the PA 452 on and off, by performing delta-sigma modulation, or by any other modulation method know to one of ordinary skill in the art. Additionally, the TX controller 454 may generate a pulse-width modulation (PWM) signal having a predetermined envelope.

The TX controller 454 may determine an initial wireless power that is to be transmitted to the wireless power receiver 460 based on a change in a temperature of the wireless power transmitter 450, a battery state of the wireless power receiver 460, a change in an amount of power received at the wireless power receiver 460, and/or a change in a temperature of the wireless power receiver 460.

The wireless power transmitter 450 may further include a temperature measurement sensor (not illustrated) configured to detect a change in a temperature of the wireless power transmitter 450. The wireless power transmitter 450 may receive from the wireless power receiver 460 information regarding the battery state of the wireless power receiver 460, the change in the amount of power received at the wireless power receiver 460, and/or the change in the temperature of the wireless power receiver 460 via communication with the wireless power receiver 460. The wireless power source 450 may detect the change in the temperature of the wireless power receiver 460 based on the information received from the wireless power receiver 460.

The TX controller 454 may adjust a voltage supplied to the PA 452 based on the change in the temperature of the wireless power transmitter 450 using a lookup table. The lookup table may be used to store a level of the voltage to be supplied to the PA 452 based on the change in the temperature of the wireless power transmitter 450. For example, when the temperature of the wireless power transmitter 450 rises, the TX controller 454 may lower the level of the voltage to be supplied to the PA 452 by controlling the variable SMPS 451.

The communication unit 455 may perform out-of-band communication using a separate communication channel. The communication unit 455 may include a communication module, such as a ZigBee module, a Bluetooth module, or any other communication module known to one of ordinary skill in the art, that the communication unit 115 may use to perform the out-of-band communication. The communication unit 455 may transmit and receive data 480 to and from the wireless power receiver 460 via the out-of-band communication.

The source resonator 471 transmits electromagnetic energy 470 to the target resonator 472. For example, the source resonator 471 may transmit the communication power and/or the charging power to the wireless power receiver 460 via a magnetic coupling with the target resonator 472.

The source resonator 471 may include a resonant circuit including an inductor and a capacitor. The inductor may be, for example, a planar spiral induction coil. The planar spiral induction coil may include a strip-shaped coil having at least one turn. A width of the at least one turn in the strip-shaped coil may change as a distance from a beginning of the strip-shaped coil increases in a length direction of the strip-shaped coil, and may be set so that an equal current may flow through each of the at least one turn. A width of each of at least one turn in the planar spiral induction coil may be designed so that an equal current may flow through each of the at least one turn. Thus, a Q-factor of the resonant circuit may be increased.

The wireless power receiver 460 includes a matching network 461, a rectifier 462, a DC/DC converter 463, a communication unit 464, a reception (RX) controller 465 (for example, RX control logic), a voltage detector 466, and a power detector 467.

The target resonator 472 receives the electromagnetic energy 470 from the source resonator 471. For example, the target resonator 472 may receive the communication power and/or the charging power from the wireless power transmitter 450 via the magnetic coupling with the source resonator 471. Additionally, the target resonator 472 may receive a variety of data from the wireless power transmitter 450 via the in-band communication.

The target resonator 472 may include a resonant circuit including an inductor and a capacitor. The inductor may be, for example, a planar spiral induction coil. The planar spiral induction coil may include a strip-shaped coil having at least one turn. A width of the at least one turn in the strip-shaped coil may change as a distance from a beginning of the strip-shaped coil increases in a length direction of the strip-shaped coil, and may be set so that an equal current may flow through each of the at least one turn. A width of each of at least one turn in the planar spiral induction coil may be designed so that an equal current may flow through each of the at least one turn. Thus, a Q-factor of the resonant circuit may be increased.

The target resonator 472 may receive the initial wireless power that is determined by the TX controller 454 based on the change in the temperature of the wireless power transmitter 450, the battery state of the wireless power receiver 460, the change in the amount of power received at the wireless power receiver 460, and/or the change in the temperature of the wireless power receiver 460.

The matching network 461 matches an input impedance viewed from the wireless power transmitter 450 to an output impedance viewed from a load of the wireless power receiver 460. The matching network 461 may be configured to have at least one capacitor and at least one inductor.

The rectifier 462 generates a DC voltage by rectifying an AC received from the target resonator 472.

The DC/DC converter 463 may adjust a level of the DC voltage output from the rectifier 462 based on a voltage required by the load. For example, the DC/DC converter 463 may adjust the level of the DC voltage output from the rectifier 462 to a level in a range of 3 volts (V) to 10 V.

The voltage detector 426 detects a voltage of an input terminal of the DC/DC converter 463, and the power detector detects a current and voltage of an output terminal of the DC/DC converter 463. The detected voltage of the input terminal may be used by the RX controller 465 to calculate a wireless transmission efficiency of the power received from the wireless power transmitter 450. Additionally, the detected current and the detected voltage of the output terminal may be used by the RX controller 465 to calculate an amount of power actually transferred to the load. The TX controller 454 of the wireless power transmitter 450 may calculate an amount of power that needs to be transmitted by the wireless power transmitter to the wireless power receiver 460 based on an amount of power required by the load and the amount of power actually transferred to the load, and may control the PA 452 to generate an amount of power that will enable the calculated amount of power to be transmitted by the wireless power transmitter 450.

If the amount of power actually transferred to the load calculated by RX controller 465 is transmitted to the wireless power transmitter 450 by the communication unit 464, the wireless power transmitter 450 may calculate the amount of power that needs to be transmitted to the wireless power receiver 460.

The RC controller 465 may perform in-band communication to transmit and receive data using a resonant frequency. During the in-band communication, the RX controller 465 may demodulate a received signal by detecting a signal between the target resonator 472 and the rectifier 462, or detecting an output signal of the rectifier 462, and demodulating the detected signal. In other words, the RX controller 465 may demodulate a message received via the in-band communication.

Additionally, the RX controller 465 may adjust an impedance of the target resonator 472 using the matching network 461 to modulate a signal to be transmitted to the wireless power transmitter 450. For example, the RX controller 465 may control the matching network 461 increase the input impedance of the target resonator 472 so that a reflected wave will be detected from the TX controller 454 of the wireless power transmitter 450. Depending on whether the reflected wave is detected, the TX controller 454 may detect a first value, for example a binary number "0," or a second value, for example a binary number "1." For example, when the reflected wave is detected, the TX controller 454 may detect "0", and when the reflected wave is not detected, the TX controller 454 may detect "1". Alternatively, when the reflected wave is detected, the TX controller 454 may detect "1", and when the reflected wave is not detected, the TX controller 454 may detect "0".

The communication unit 464 may perform out-of-band communication using a separate communication channel. For example, the communication unit 464 may include a communication module, such as a ZigBee module, a Bluetooth module, or any other communication module known to one of ordinary skill in the art, that the communication unit 115 may use to perform the out-of-band communication. The communication unit 464 may transmit and receive the data 480 to and from the wireless power transmitter 450 via the out-of-band communication.

The TX controller 454, the communication units 455 and 464, and the RX controller 465 in FIG. 4B and the full-wave 3D electromagnetic simulator described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, or a sensor, a stationary device, such as a desktop PC, a high definition television (HDTV), an optical disc player, a set-top box, a home appliance, or any other device known to one of ordinary skill in the art that is capable of wireless communication and/or network communication.

While this disclosure excludes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A planar spiral induction coil comprising:
a strip-shaped coil having at least one turn, the at least one turn having a width that changes as a distance from a beginning of the strip-shaped coil increases in a length direction of the strip-shaped coil,
wherein each turn of the at least one turn has a respective width that causes an equal current to flow through each turn of the at least one turn, and
wherein a shape of each turn of the at least one turn is a torus having a rectangular portion connecting between turns having different widths.

2. The planar spiral induction coil of claim 1, wherein a number of turns of the at least one turn is 1 to 20 turns.

3. The planar spiral induction coil of claim 1, wherein each turn of the at least one turn has constant geometric dimensions.

4. The planar spiral induction coil of claim 1, wherein an amount of current flowing through each turn of the at least one turn is proportional to a ratio of a total amount of current flowing through the planar spiral induction coil to a number of turns of the at least one turn.

5. The planar spiral induction coil of claim 1, wherein the shape of each turn of the at least one turn is a torus having a rectangular portion connected to a next turn of the at least one turn, and wherein the width of each turn of the at least one turn is different than the width of the next turn.

6. A wireless power transmitter comprising:
a source resonator configured to transmit wireless power to a wireless power receiver via resonance with a target resonator of the wireless power receiver, and comprising a planar spiral induction coil, the planar spiral induction coil comprising a strip-shaped coil having at least one turn, the at least one turn having a width that changes as a distance from a beginning of the strip-shaped coil increases in a length direction of the strip-shaped coil; and
a power supply configured to supply power to the source resonator,
wherein each turn of the at least one turn has a respective width that causes an equal current to flow through each turn of the at least one turn, and
wherein a shape of each turn of the at least one turn is a torus having a rectangular portion connecting between turns having different widths.

7. A wireless power receiver comprising:
a target resonator configured to receive wireless power from a wireless power transmitter via resonance with a source resonator of the wireless power transmitter, and comprising a planar spiral induction coil, the planar spiral induction coil comprising a strip-shaped coil having at least one turn, the at least one turn having a width that changes as a distance from a beginning of the strip-shaped coil increases in a length direction of the strip-shaped coil; and
a load configured to receive power from the target resonator,
wherein each turn of the at least one turn has a respective width that causes an equal current to flow through each turn of the at least one turn, and
wherein a shape of each turn of the at least one turn is a torus having a rectangular portion connecting between turns having different widths.

8. A method of designing a planar spiral induction coil, the method comprising:
setting a number of turns of at least one turn in a strip-shaped coil included in the planar spiral induction coil, the at least one turn having a width that changes as a distance from a beginning of the strip-shaped coil increases in a length direction of the strip-shaped coil; and
determining a respective width of each turn of the at least one turn so that an equal current flows through each turn of the at least one turn and,
wherein a shape of each turn of the at least one turn is a torus having a rectangular portion connecting between turns having different widths.

9. The method of claim 8, further comprising setting a distance between adjacent turns of the at least one turn.

10. The method of claim 8, wherein the setting of the number of turns of the at least one turn comprises setting the number of turns of the at least one turn within a range of 1 turn to 20 turns.

11. The method of claim 8, wherein each turn of the at least one turn has constant geometric dimensions.

12. The method of claim 8, wherein the determining of the respective width of each turn of the at least one turn comprises:
acquiring information on a current flowing through a single turn having a same width as the planar spiral induction coil;
splitting the single turn into a plurality of domains corresponding to the at least one turn based on the set number of turns of the at least one turn;
setting respective widths of the plurality of domains so that an equal current flows through each domain of the plurality of domains; and
setting the respective width of each turn of the at least one turn to the respective width of a corresponding domain of the plurality of domains.

13. The method of claim 8, wherein an amount of current flowing through each turn of the at least one turn is proportional to a ratio of a total amount of current flowing through the planar spiral induction coil to the set number of turns of the at least one turn.

14. A non-transitory computer-readable storage medium storing instruction that, when executed by a processor, cause the processor to perform the method of claim 8.

15. A planar spiral induction coil comprising:
a planar coil having at least one turn,
wherein each turn of the at least one turn has a respective width that is different from a respective width of every other turn of the at least one turn and causes an equal current to flow through each turn of the at least one turn, and
wherein a shape of each turn of the at least one turn is a torus having a rectangular portion connecting between turns having different widths.

16. The planar spiral induction coil of claim 15, wherein a respective width of each turn of the at least one turn increases from an innermost turn of the at least one turn to an outermost turn of the least one turn.

17. The planar spiral induction coil of claim 15, wherein each turn of the at least one turn has constant geometric dimensions.

18. The planar spiral induction coil of claim 17, wherein the constant geometric dimensions of each turn are different from the constant geometric dimensions of every other turn of the at least one turn.

19. The planar spiral induction coil of claim 15, wherein the rectangular portion of the torus of the shape of each turn of the at least one turn is different from the rectangular portion of the torus of the shape of every other turn of the at least one turn.

* * * * *